US011878484B2

(12) United States Patent
Mombourquette et al.

(10) Patent No.: US 11,878,484 B2
(45) Date of Patent: Jan. 23, 2024

(54) ERGONOMIC HEAT PRESS

(71) Applicant: ColDesi, Inc., Tampa, FL (US)

(72) Inventors: Mark Mombourquette, Treasure Island, FL (US); Brett Weibel, Seminole, FL (US)

(73) Assignee: ColDesi, Inc., Tampa, FL (US)

( * ) Notice: Subject to any disclaimer, the term of this patent is extended or adjusted under 35 U.S.C. 154(b) by 0 days.

(21) Appl. No.: 17/394,478

(22) Filed: Aug. 5, 2021

(65) Prior Publication Data

US 2022/0040947 A1 Feb. 10, 2022

Related U.S. Application Data

(60) Provisional application No. 63/061,537, filed on Aug. 5, 2020.

(51) Int. Cl.

*B30B 1/04* (2006.01)
*B44C 1/17* (2006.01)
*B30B 15/14* (2006.01)
*B30B 15/06* (2006.01)

(52) U.S. Cl.

CPC .............. *B30B 1/04* (2013.01); *B30B 15/064* (2013.01); *B30B 15/148* (2013.01); *B44C 1/1712* (2013.01)

(58) Field of Classification Search

CPC ....... B30B 1/04; B30B 15/064; B30B 15/148; B30B 15/34; B30B 9/08; B44C 1/1712; B44C 1/1729; B41F 16/02; B41F 16/0046
USPC ............................................................. 100/43
See application file for complete search history.

(56) References Cited

U.S. PATENT DOCUMENTS

| | | | | |
|---|---|---|---|---|
| 5,252,171 A * | 10/1993 | Anderson | B30B 1/12 | 156/359 |
| 5,769,999 A * | 6/1998 | Anderson | B29C 65/18 | 100/319 |
| 6,058,834 A * | 5/2000 | Beckwith | B30B 1/12 | 100/282 |
| 7,185,584 B1 * | 3/2007 | Woods | D06B 11/0076 | 100/320 |
| 2009/0242096 A1 * | 10/2009 | Robinson | B30B 1/04 | 156/64 |

(Continued)

FOREIGN PATENT DOCUMENTS

WO WO 89 07045 * 8/1989

*Primary Examiner* — Adam J Eiseman
*Assistant Examiner* — Fred C Hammers
(74) *Attorney, Agent, or Firm* — Dorton & Willis, LLP

(57) ABSTRACT

A heat press for decorating substrates includes a support frame, a lower platen assembly supported on the support frame, and a linkage assembly having at least an upper link arm pivotally coupled with the support frame for movement to and between first and second positions. An upper platen assembly is coupled with the support frame by the linkage assembly for movement relative to the lower platen assembly to and between an open condition away from the lower platen assembly, and a closed condition adjacent the lower platen assembly, as the upper link arm is moved to and between the first and second positions. A linear actuator cooperates with the linkage assembly to further move the upper platen assembly in the closed condition in a direction to clamp an upper platen against a lower platen by moving an actuator rod from an extended position toward a retracted position.

15 Claims, 17 Drawing Sheets

(56) References Cited

U.S. PATENT DOCUMENTS

| | | | | |
|---|---|---|---|---|
| 2010/0206180 | A1* | 8/2010 | Ricchio | A47J 37/0611 99/422 |
| 2014/0238600 | A1* | 8/2014 | Mahn | B44C 1/1712 156/309.9 |
| 2018/0093439 | A1* | 4/2018 | Galkin | B30B 15/12 |
| 2020/0324542 | A1* | 10/2020 | Lin | B41F 16/02 |
| 2021/0337916 | A1* | 11/2021 | Robinson | B30B 1/04 |
| 2023/0051762 | A1* | 2/2023 | Weibel | B30B 15/007 |

* cited by examiner

ERGONOMIC HEAT PRESS

CROSS-REFERENCE TO RELATED APPLICATIONS

This application claims the benefit of priority to U.S. Provisional Patent Application Ser. No. 63/061,537 filed on Aug. 5, 2020, the disclosure of which is incorporated by reference herein in its entirety.

TECHNICAL FIELD

The present invention relates generally to material processing machines and, more particularly, to heat press machines for decorating substrates.

BACKGROUND

Heat presses have been used in industry for many decades. Decorators have used these heat presses for many purposes, such as ironing substrates, transferring indicia onto substrates, drying coatings applied to substrates, sublimating color onto substrates, curing ink applied to substrates, etc. Over the years engineers have developed many varieties of heat press designs to serve various functions and which utilize varying amounts of automation. Nevertheless, there is still a need to develop automation for heat presses that provides simplified functionality to the machine operator.

One type of heat press movement is referred to as a clam-shell design. The clam-shell design generally includes upper and lower platen assemblies attached to a pivoting mechanism. The pivoting mechanism has a horizontal hinge point some distance to the rear of both platens. This pivoting mechanism allows the upper platen to lift angularly about the pivot hinge point and away from the surface of the lower platen. This angular lift movement behind both platens is how the clam-shell design is named, as the movement is similar to that of a clam shell. These clam-shell type heat presses are more compact, have a smaller footprint, are lighter in weight, and are generally less expensive than other types of heat press movements. The main disadvantages of the clam-shell heat press design are excessive heat loss to the surrounding area, a partially obstructed work area, poor ergonomic design due to the angular movement of the upper platen, and poor ergonomic design in terms of the amount of force required by an operator to operate the machine.

In the open position of the clam-shell type heat press, the upper platen is generally held at about a 45-degree angle to about a 70-degree angle over the top of the lower platen surface, this being the main design feature of the clam-shell heat press. This design feature partially obstructs the lower platen surface making it difficult to lay product on the lower platen or to use the lower platen as a work surface without getting burned. While the heat press is open, the heat radiates out toward the operator and the surrounding environment, making this heat press design uncomfortable to work with and inefficient with respect to energy usage.

In order to get around limitations of the partially obscured lower platen, some heat press manufacturers have incorporated linear slides on which the lower platen can move. When the heat press is in the open position the operator can pull the lower platen straight forward in order to gain access to the lower platen. While this feature does open up the lower platen as a work surface, it requires excessive movement of the operator; specifically, the operator must step backward as they pull the platen out and then step forward when the platen is pushed in. Thus, there is a lot of extra movement required by the operator when using the heat press in this fashion In addition to the aforementioned drawbacks, clam-shell type heat presses have poor ergonomics. These heat presses have mechanical linkages attached to an operator arm that is generally directly above the center of the open upper heated platen. During use, an operator lowers the upper heated platen by pulling down on this operator arm until the upper heated platen contacts the substrate which is on the lower support platen. Once the upper platen has contacted the substrate the operator will need to apply force down onto the handle in order to lock the upper heated platen onto the substrate. This action of pushing the mechanical linkage to lock over-center can require excessive force to be applied by the operator. Thus, in order to get the heated platen into a closed and locked position, conventional clam-shell type heat press designs result in poor ergonomics.

Additionally, most conventional clam-shell type heat presses have a spring force that will open the press and keep it in an open position until the press is ready to be used. The need for users to overcome the substantial spring force in order to close the press results in poor ergonomics on almost all clam-shell type heat press designs.

Another issue with the clam-shell design relates to their auto-release mechanism. Once the press cycle has timed out an electromagnet which holds the upper platen in the closed position releases its hold allowing the upper platen assembly to spring open to original position. While this auto-release system has been implemented to keep from burning substrates, and generally frees the operator from constantly monitoring the press, its implementation can lead to issues in decorating apparel. As the electromagnet releases its hold, there is a sudden and violent "pop" action which can, in some cases, damage the decorated garment. This is especially noticeable in instances where a very high pressing force is required.

To date there has not been an improved version of the basic clam-shell type heat press design that addresses the above and other drawbacks. Accordingly, a need exists for an improved version of this heat press that will allow clear, unobstructed access to the lower platen surface, improved ergonomic design to eliminate shoulder and back strain, and automated systems to save energy, avoid injury, and simplify the machine process.

SUMMARY

The embodiments in accordance with the present disclosure provide an improved version of a heat press machine with semi-automatic and safe operation as well as the ability to expose the lower platen to be used as an unobstructed work surface. There exists a need to improve how heat press machines function to improve safety, efficiencies and ergonomic concerns. The principles of the present invention are described herein in connection with clam-shell type heat presses, however, it will be appreciated that the features and benefits could easily be implemented on other types of heat presses as well.

In one aspect, a heat press for decorating substrates includes a support frame, a lower platen assembly supported on the support frame, and a linkage assembly having at least an upper link arm pivotally coupled with the support frame for movement to and between first and second positions. An upper platen assembly is coupled with the support frame by the linkage assembly for movement relative to the lower platen assembly to and between an open condition away from the lower platen assembly, and a closed condition adjacent the lower platen assembly, as the upper link arm is moved to and between the first and second positions. A linear actuator cooperates with the linkage assembly to further move the upper platen assembly in the closed condition in a direction to clamp an upper platen against a lower platen by moving an actuator rod from an extended position toward a retracted position.

In one aspect, most conventional clam-shell style heat presses can be adapted, such as by retrofitting with appropriate features as described herein, to provide a heat press according the present disclosure. In another aspect, a heat press in accordance with the present disclosure incorporates a system control module that could be retrofit into the upper link arm on most clam-shell heat presses. Within the control module, there may be provided a main control circuit board with an operator interface, an electric linear actuator, certain multi-function sensors, a secondary interface for use when the heat press is open, and associated mechanical and electrical connection points. The rear end of the linear actuator may be connected to the mounting structure of the control module through a rear clevis pin. This connection allows the linear actuator to pivot on this clevis pin. The rod end of the linear actuator may include a ferrous metal plate pivotally attached to it so that this plate can make contact with the electromagnet. The front facing panel of the control module incorporates the main control board with touch interface buttons and a main touch screen display. When the heat press is in the closed position, an operator can interface with the main control panel to make setting changes and monitor certain process steps.

In another aspect, a heat press in accordance with the present disclosure may be open in its normal state, such that the main lever arms are raised and extend in a mostly upward direction. Since the control module may be mounted within these main lever arms, the main touch screen display would be out of sight of the operator when the lever arms extend upwardly. Therefore, a second information display screen and interface may be mounted on a bottom of the control module so that when the main lever arms are raised, the operator can still view the display of certain system parameters. When the operator needs to make parameter changes, the operator can pull down on the handle attached to the main lever arms and make desired changes using the main control panel.

As the heat press is in its open state, the linear actuator rests against the internal housing at a certain angle within the control module. Also, the linear actuator's rod is partially extended to a predetermined length. As the operator pulls down on the main lever arms the position of the linear actuator naturally causes the ferrous plate on the end of the actuator rod to align with and contact the top of the electromagnet. The electromagnet may be commanded to be in an "on" state as the main lever arms are lowered so that when the ferrous plate contacts the electromagnet, the ferrous plate will be magnetically held in place. At this stage of the movement, the heated platen is still some specified distance above the substrate which is supported by the lower platen. When the system control senses that the ferrous plate has made contact with the electromagnet, it will command the linear actuator to move in such a way so that the upper platen is forced down onto the substrate in a clamping motion. Due to the nature of the mechanical linkage in this embodiment, with respect to how the linear actuator is mounted, the linear actuator is then retracted in order to force the upper platen closed. Once the specified cycle time has timed out, the linear actuator is commanded to extend so as to raise the heated platen to a point where the natural spring force implemented in the upper platen assembly can lift the upper platen to its fully open state once electromagnet is turned off. The electromagnet is commanded to maintain its hold onto the ferrous plate until a point where the linear actuator has lifted the upper platen some distance above the substrate, so no part of the upper platen is touching the substrate or lower platen. Once the linear actuator has been extended to this point, the electromagnet is turned off, releasing its hold on the ferrous plate. This creates a very fluid soft opening motion for the upper heated platen regardless of the amount of pressure used to press the substrate. Using the electric linear actuator in this manner eliminates any "popping" action or sudden opening movement by the clam-shell heat press. Another benefit of using the linear actuator to create force is that it takes all stress off of the operator to produce such force. Thus, having an actuator to produce, control, and smoothly release the force needed in the pressing action leads to a much more ergonomic system.

Clam-shell type heat presses are conventionally designed using a four-bar linkage to lower the upper platen onto the lower platen and produce force. In this four-bar linkage, it is common for the handle which the operator uses to lower the upper platen to be an extension of the upper link arm that also forms the main lever arms. Using this upper link arm to incorporate the operator handle results in a very high reach point when the heat press is open. In another embodiment, the main lever arms of a heat press in accordance with the present disclosure may be shortened so there is no operator handle incorporated within them, and an alternative operator handle may be affixed to the upper platen support structure. This alternative handle would move as if attached directly to the upper platen. By changing the location of where the operator handle attaches to the machine, it significantly reduces the height of which the operator much reach. This makes for a much more ergonomic operation.

The upper platen assembly may be configured to return to its fully open position by the use of some spring force. Due to the nature of the mechanisms in these clam-shell heat presses, the highest force required by the spring mechanism occurs when the upper platen is first released from pressing the substrate on the lower platen. Therefore, the force needed to initially lift the upper platen off of the substrate dictates the amount of spring force used in the complete system. Because the linear actuator of a heat press according to the present disclosure lifts the upper platen assembly substantially past this initial lift distance, the amount of spring force to lift the upper platen assembly is less. Since there is less force needed to lift the load under the proposed invention, the spring mechanism can be designed with less spring force. This may be important during lowering of the upper platen assembly, as an operator (or motor mechanism in the case of an automated system) must overcome the specified spring force. Thus, the implementation of the lift actuator has a profound effect on the operator to lessen stress placed on them when operating the heat press over time.

In another aspect in accordance with the present disclosure, a sensor may be provided in the control module that can accurately sense multiple degrees of freedom on multiple axes of movement. These are common types of sensors that are readily available from electronics distributors. An exemplary sensor is part #MPU-6050 available from Mouser.com, or the like. The sensor circuit has six independent acceleration and angular rate readings which provide data that the control module can use to determine the orientation of the upper platen assembly on various axes. With this type of sensor, the control module can calculate the exact position of the upper platen assembly and sense any interference in its movement via G-force sensing. The control system may receive positional information to track rotation of the upper platen assembly and sense disturbances at any point in this movement. Additionally, gesture control can be implemented, as the accelerometer feature can sense a person tapping the upper assembly at any location. For example, an operator could tap the handle or linkage assembly two times to command the electromagnet to release during the middle of a cycle. Other gesture commands could also be programmed to make operation of the machine easier and more functional.

Another use of the multi-axis sensor is to control the "on" command of the electromagnet. Since the control system can determine the precise rotational location of the upper link arm, when the linear actuator ferrous plate is within range of contacting the electromagnet, the control system can detect an abrupt change in G-force (or "bump") sensed by the accelerometer and know when contact with the electromagnet has been made. Additionally, the control system can look for a "bump" when the upper platen is in the range where it will contact a substrate on the lower platen, then command the rod of the linear actuator to extend so that the ferrous plate makes contact with the electromagnet. In this way the motion sensor may perform various functions in the operation of the heat press.

To assist the control system to identify precise timing of when the ferrous plate contacts the electromagnet, additional sensors may be provided on the ferrous plate or electromagnet which sense when the two components have made contact. The additional sensors could be any type of sensor or switch suitable for sensing contact of the two surfaces. In one embodiment, the ferrous plate may be electrically isolated from the rest of the heat press due to the internal design of the linear actuator. Thus, a simple wire connected from the control system to the ferrous plate can act as a conductance sensor to determine when the ferrous plate contacts the electromagnet.

In another aspect, a heat press in accordance with the principles of the present disclosure may include a rotary support assembly mounted beneath the lower platen and configured to allow the lower platen to be moved to a location where it is not substantially obstructed by the upper platen. For example, if an operator of the press wishes to load, unload, or otherwise work on a substrate without interference by the upper heated platen, the operator may rotate the lower platen so that it is located to one side of the heat press or the other, or alternatively move the lower platen all the way in front of the heat press. This movement can be done manually, where the operator pushes or pulls the lower platen to the desired position, or automatically with the implementation of a motorized system to rotate the lower platen. In one embodiment, a pivot point that the lower platen rotates about may be positioned some distance forward from the geometric center of the lower platen. This configuration allows the lower platen to be rotated eccentrically with respect to its geometric center. Such eccentric rotation places the majority of the lower platen outside the perimeter of the upper platen assembly when the lower platen is rotated away from its normal working position.

In order for the lower platen assembly to rotate freely, in one embodiment it may mounted slightly above a lower housing that supports the lower platen. In this embodiment, the lower platen and rotary support assembly may be mounted on the lower housing with springs and linear shafts that hold the lower platen slightly above the lower housing. As the upper platen makes contact with the lower platen, the pressure of the upper platen overcomes the spring force holding the lower platen above the lower housing and allows the upper platen to push the lower platen down onto the support frame. In this way, the rotary support assembly or rotary motor system does not take any of the force that the upper platen transmits to the lower platen during a pressing cycle, as the lower platen will be forced to rest on the lower housing when it is under load.

The compliance resulting from supporting the lower platen on springs serves two functional purposes. First as, explained above, it allows the lower platen to rotate freely without scraping or dragging on the lower housing. Second, this configuration gives the lower platen compliance so that as the upper platen makes contact with the substrate that is on the lower platen, the lower platen can move, rock, or pivot so as to make it completely parallel and in complete contact with the upper platen when the force is applied to the substrate.

To make it easier for an operator to rotate the lower platen, side trays, with integral handles, may be mounted onto each side of the lower platen. The side trays may perform various functions. First, the integral handles make it easier for operators to grasp and rotate the lower platen in a manual-movement embodiment. The handles are also insulated from excess heat which makes a more comfortable arrangement than requiring operators to grab a lower platen that may be quite hot. In addition, side trays may be provided that are configured to hold excess material that would normally fall outside of the perimeter of the lower platen. Since the lower platen is able to be rotated partially, 180 degrees, 360 degrees, or to any angular position in-between, any excess material hanging off the edges of the lower platen is prevented from becoming pinched between the rotating lower platen and the lower housing. Thus, it is another function of the side trays to hold excess material so that it will not get caught in the heat press structure. A catch tray may also be mounted on the front edge of lower platen to support any excess material that may hang off of the front edge of the lower platen. These catch trays may be beneficial to support the garment when motorized lower platen movement is implemented.

BRIEF DESCRIPTION OF DRAWINGS

The accompanying drawings, which are incorporated in and constitute a part of this Specification, illustrate exemplary embodiments of the invention and, together with a general description of the invention given above, and the detailed description given below, serve to explain the principles of the invention.

DETAILED DESCRIPTION

Figure 1:
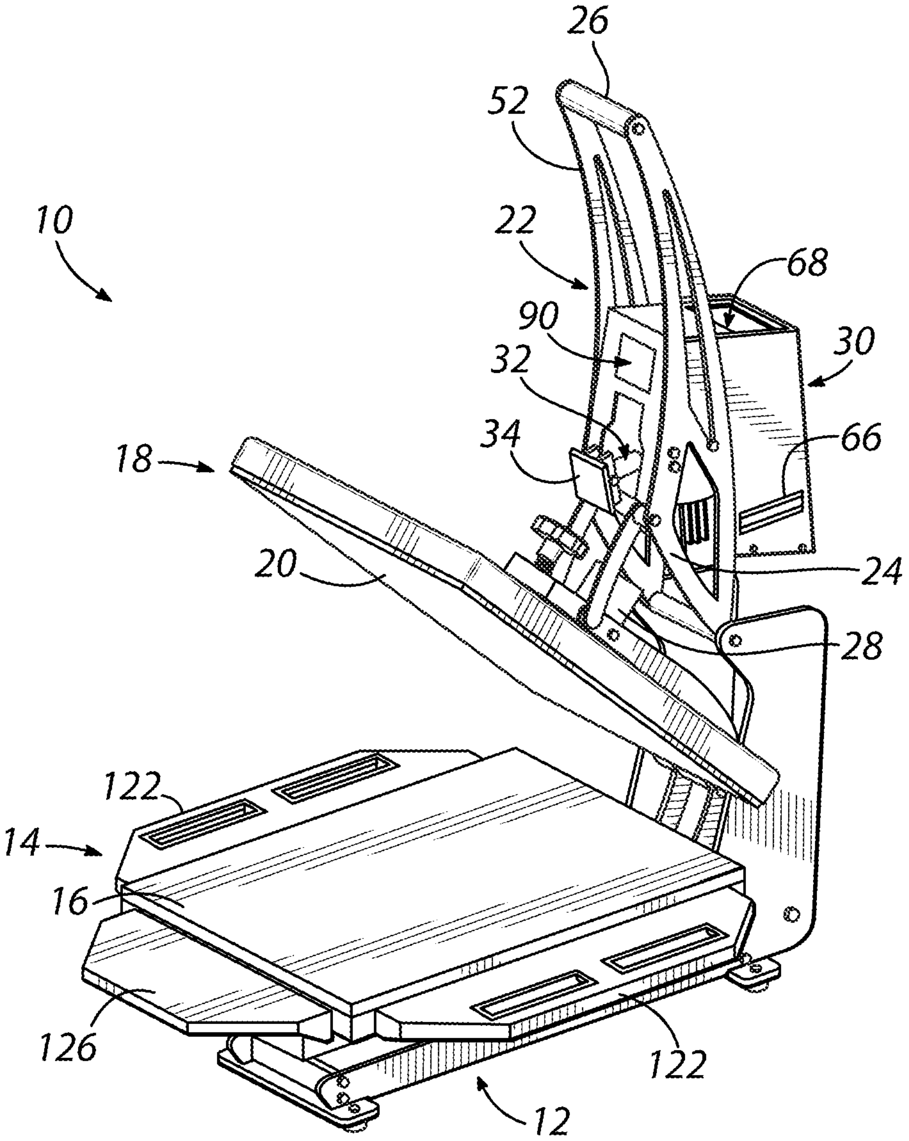
FIG. 1 is a perspective view of an exemplary machine for heat pressing substrates in accordance with the principles of the present disclosure.

FIG. 1 depicts an exemplary machine (heat press) 10 for heat pressing substrates in accordance with the principles of the present disclosure. In the embodiment shown, the heat press 10 includes a support frame 12, a lower platen assembly 14 including a lower platen 16 that can be easily interchanged with differently sized platens, an upper platen assembly 18 including an upper, heated platen 20, a linkage assembly 22 including an upper link arm 24, an operator handle 26, an electromagnet 28, a control module 30, a linear actuator 32 housed within the control module 30 and having a ferrous plate 34 for coupling with the electromagnet 28 as the major components. The lower platen assembly 14 is supported on the support frame 12, and the upper platen assembly 18 is coupled with the support frame 12 by the linkage assembly 22 for movement relative to the lower platen assembly 14 to and between a first, open condition (depicted in FIGS. 1 and 2A) and a second, closed condition (depicted in FIG. 2B).

Figure 2A:
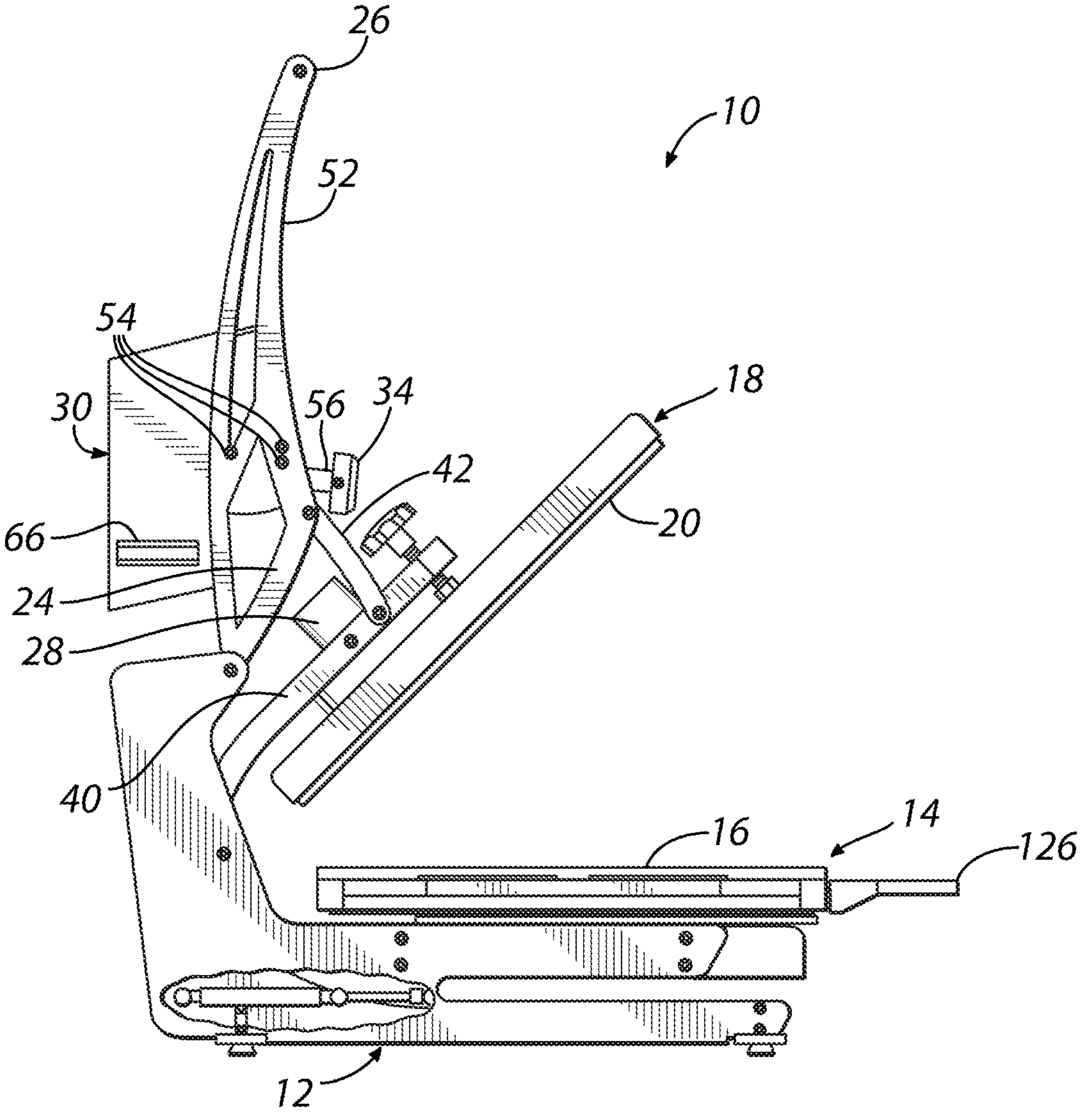
FIG. 2A is a left side view of the heat press of FIG. 1 in a fully open position.

FIG. 2A is a left side view of the heat press 10 in the first, fully open position. The exemplary heat press 10 shown and described herein utilizes a pair of spaced apart linkage assemblies 22 to raise and lower the upper platen assembly 18 as described hereinbelow. Because the linkage assemblies 22 are identical in construction, only one will be described in detail herein. Each linkage assembly 22 comprises an upper link arm 24 pivotally coupled with an upper end of the support frame 12 for movement to and between a first position corresponding to the first, open condition of the upper platen assembly 18, and a second position corresponding to the second, closed condition of the upper platen assembly 18. The linkage assembly 22 further includes a first intermediate link 40 pivotally coupled with the support frame 12 at a position on the support frame 12 below the upper link arm 24, and a second intermediate link 42 coupled between the upper link arm 24 and the first intermediate link arm 40. As best seen in FIGS. 4B and 6B, a first end 44 of a lower link 46 of the linkage assembly 22 is coupled to an end of the first intermediate link 40, and a second end 48 of the lower link 46 is coupled with a biasing member 50 attached to the support frame 12.

The linkage assembly 22 defines a four-bar mechanism which is operable to pivotally lift and lower the upper platen assembly 18 and, in some configurations, lock the upper platen 20 in a clamped condition against the lower platen 16. In the embodiment shown, the biasing member 50 comprises a spring mechanism attached between the support frame 12 and the lower link 46 of the linkage assembly 22. The spring mechanism is configured to bias the entire upper platen assembly 18 toward the first, fully open position depicted in FIG. 2A. Accordingly, when there are no forces keeping the upper platen assembly 18 in a lowered or closed position, the natural state of the heat press 10 is for the upper platen assembly 18 to be in a raised and open position. Such spring mechanisms can be of various designs or configurations. In the exemplary embodiment shown herein, the spring mechanisms comprise gas springs typical of those used in mechanical systems to lift loads.

In the embodiment shown, structure extends from the upper link arm 24 of each linkage assembly to define lever arms 52 for mounting the operator handle 26. The control module 30 is mounted in between the lever arms 52 and at a position where the linear actuator 32 housed within the control module 30 can be used to apply force on the upper platen assembly 18. The control module 30 is a separate assembly that may be rigidly attached to the lever arms 52, for example, via three control module connection points 54 on each side of the control module 30 (see FIG. 2A). The internal linear actuator 32 is mounted within the control module 30 at a position such that the ferrous plate 34 coupled with the distal end of the actuator rod 56 of the linear actuator 32 will naturally align with and make contact with the electromagnet 28 as the lever arms 52 are lowered (and thus the upper platen assembly 18 is lowered) toward the lower platen 16.

Figure 2B:
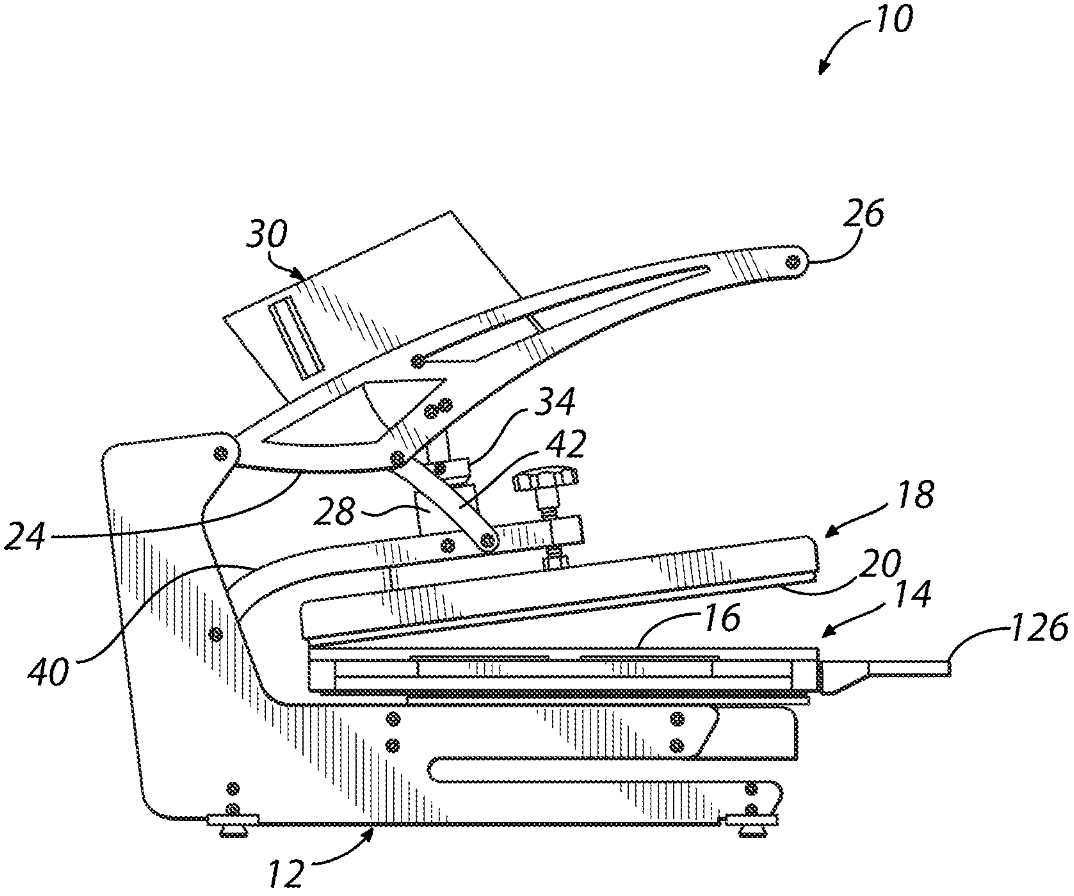
FIG. 2B is a left side view of the heat press of FIG. 1 in a partially closed position.

FIG. 2B is a side view of the heat press 1 in a partially closed configuration wherein the upper link arm 24 has been moved to the second position and the lower platen assembly 18 is in the second, closed condition with the upper platen 20 adjacent the lower platen 16. In this configuration, the ferrous plate 34 provided on the rod 56 of the linear actuator 32 first makes contact with the electromagnet 28. In this embodiment, an operator will manually pull the upper heated platen assembly 18 down using the operator handle 26, thus making for a safe operation where the operator is able to monitor the movement of the upper heated platen assembly 18. In other embodiments, movement of the upper heated platen assembly 18 can be automated with motors and/or actuators using advance sensing methods to protect against objects getting caught between the upper platen 20 and the lower platen 16.

The actuator rod 56 of the linear actuator 32 is partially extended so that when the ferrous plate 34 first makes contact with the electromagnet 28, the heated upper platen 20 is not in intimate contact with the lower platen 16 or a substrate supported on the lower platen 16, but is located some distance above the substrate. This distance is defined herein as the hover gap 0. The control module 30 may utilize the hover gap 0 to protect an operator against getting pinched, to hover the heated upper platen 20 above the substrate for various cycle preferences, and for applications requiring non-contact heating of substrates. Once the operator lowers the upper heated platen assembly 18 into the position depicted in FIG. 2B and the control module 30 senses that the ferrous plate 34 has made contact with the electromagnet 28, the control module 30 may energize the electromagnet 28 so that it attracts and clamps onto the ferrous plate 34 to thereby hold the upper platen assembly 18 in this partially open configuration.

Figure 2C:
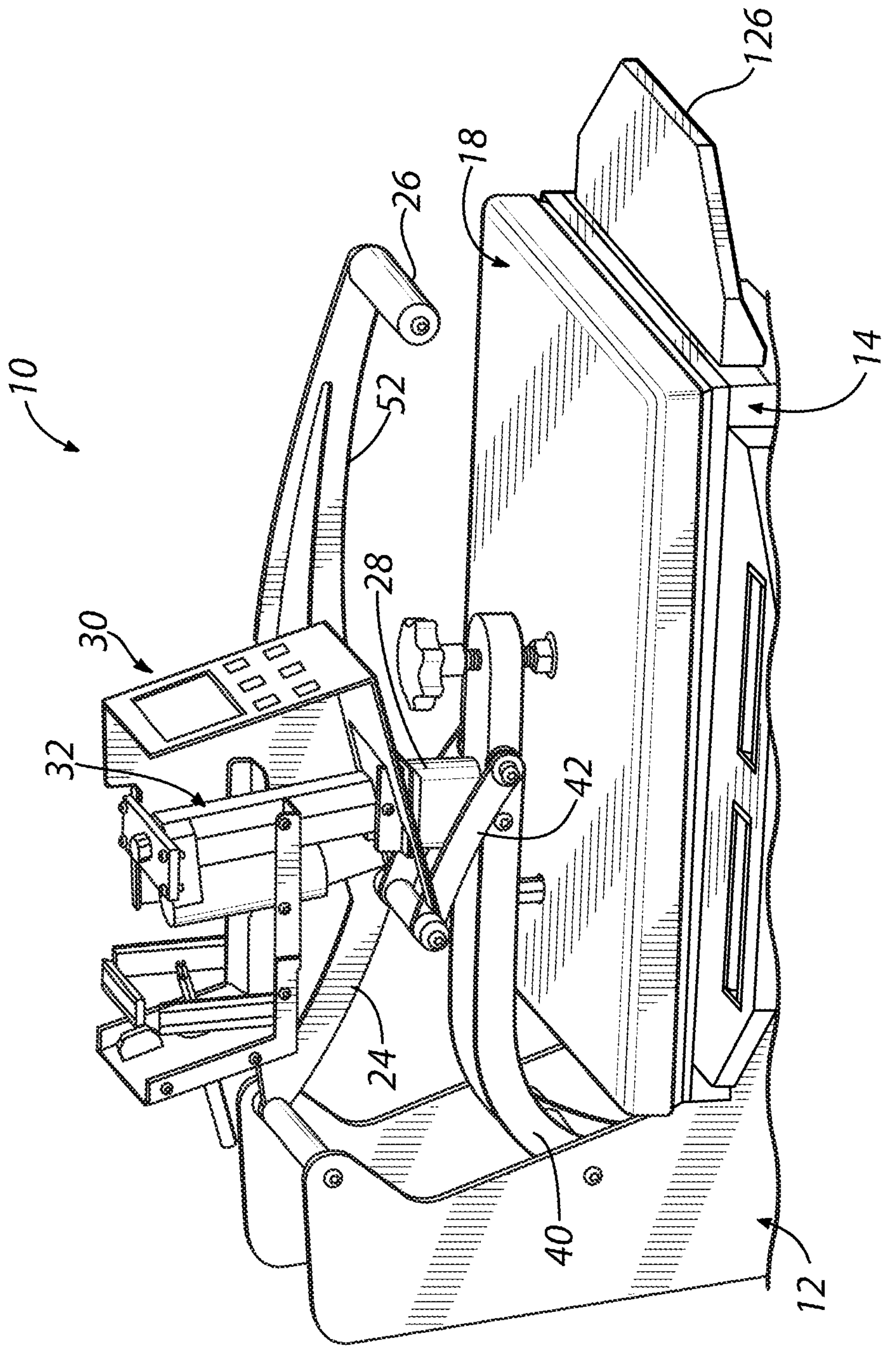
FIG. 2C is a detail side view of the exemplary heat press with elements removed to illustrate an exemplary control module mounted in the linkage assembly and the heat press in a fully closed position.

FIG. 2C is a partial view of the exemplary heat press 10 in a fully closed and clamped configuration. In this configuration the rod 56 of the linear actuator 32 has been retracted to the point where the upper platen 20 makes contact with the substrate on the lower platen 16 and there is no longer a hover gap 0. The amount of force exerted on the lower platen 16 is dictated by the amount of force generated by the linear actuator 32.

Figure 3A:
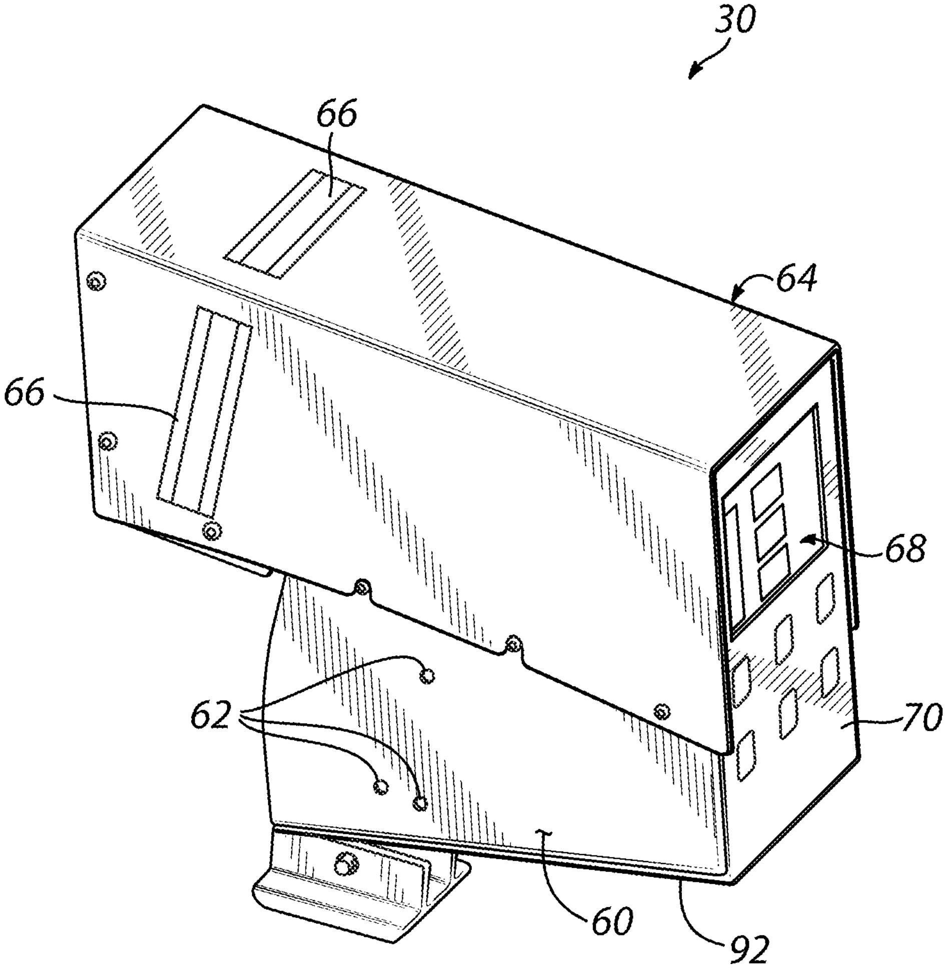
FIG. 3A is a perspective view of the control module.

FIG. 3A shows an exemplary control module 30 in accordance with the principles of the present disclosure. In this embodiment, the control module 30 is a complete assembly that can be mounted into an existing clam-shell type heat press in order to retrofit a conventional heat press to include features of the exemplary heat press 10 described herein. The control module 30 includes a control module side member 60 on each side of the assembly. Three tapped holes 62 are provided on each control module side member 17 to align with control module connection points 14 located on each lever arm 52 as shown in FIG. 2A. The control module 30 may thereby be fastened to the lever arms 52 using standard fasteners.

Also shown in FIG. 3A is the control module cover 64 with integral machine status lights 66. In one embodiment, the machine status lights 66 can comprise multi-color RGB style LED strip lights to provide an operator with a quick view of the status of the heat press 10 at different times during a processing cycle based on the color emitted. For example, when the heat press 10 is first turned on the status lights 66 can be illuminated with an amber color. Once the heated upper platen 20 has reached a set temperature, the status lights 66 can be changed to a green color. The operator is thereby able to determine the status of the heat press 10 from across the room by viewing the color that these status lights 66 emit, without having to read a display panel. The status lights 66 can also be configured to change colors for different functions of the heat press 10, thereby allowing a very quick status of machine function by viewing from a distance. This can be particularly helpful in situations where there are many heat pressing stations, as operators and supervisors can easily view a group of heat presses 10 from a distance and ascertain their operational status. The control module 30 may further include an operator interface 68 on its front surface 70. The operator interface 68 may comprise a display and/or input mechanisms that enable an operator to change settings, input data, and interface with the heat press 10.

Figure 3B:
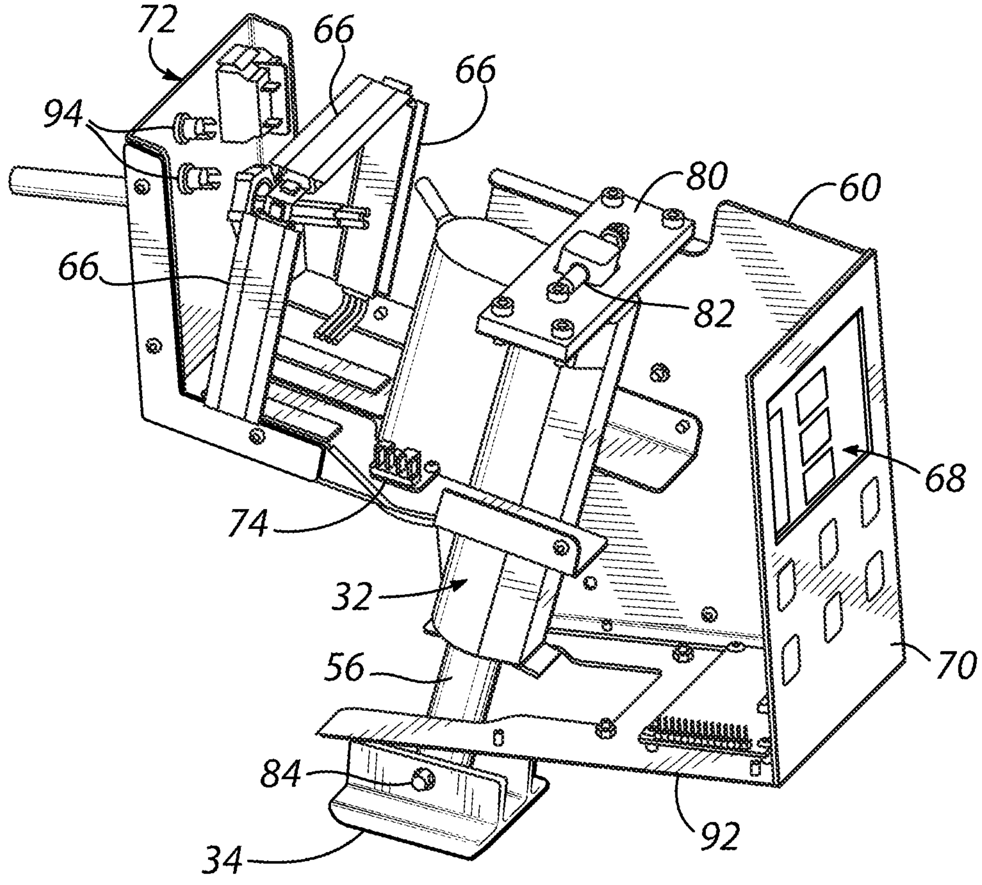
FIG. 3B is a view of the control module of FIG. 3A with outer panels removed.

FIG. 3B is a view of the control module 30 with panels 60 and cover 64 removed to show detail. In this view it is seen that the status lights 66 are mounted on the three sides of the control module cover 64. A power entry bracket 72 includes electric connection points to items outside of the control module 30. Mounted on the bottom inside surface of this power entry bracket 72 is a positional information sensor 74. Feedback from the positional information sensor 74 is used by the control module 30 to detect the true angular position of the upper platen assembly 18 with respect to the lower platen 16. The positional information sensor 74 also provides information that the control module 30 may use to stop the upper platen assembly 18 at different positional angles for adjusting hover positions or open positions of the upper platen assembly 18 and various gesture controls. Beneficially, information provided by the positional information sensor 74 enables the heat press 10 to have a high degree of intelligence and operational features.

The exemplary heat press 10 may further include an additional or alternative sensor in the form of a conductance wire 76 connected to the ferrous plate 34, such as by an anchor screw 78. The conductance wire 76 also connects to an input pin on the heat press main logic board (not shown). The ferrous plate 34 may be electrically isolated from the rest of the heat press 10 by the linear actuator 32. When the ferrous plate 34 contacts the electromagnet 28, electric current will run from the input pin on the main logic board, through the conductance wire 76, to the ferrous plate 34 and the rest of the heat press 10. A microprocessor in the control module 30 may be configured to sense the flow of electric current and makes logic decisions based on the sensed current. This is one method of sensing when the ferrous plate 34 contacts the electromagnet 28.

In the embodiment shown, the linear actuator 32 is structurally mounted to the control module side members 60 by a rear clevis support bracket 80 coupled with the linear actuator 32. A clevis pin 82 inserted through a mounting hole provided at the rear of the linear actuator 32 may be used to couple the linear actuator 32 to the rear clevis support bracket 80. The linear actuator 32 is supported on the rear clevis support bracket 80 such that the linear actuator 32 is able to freely pivot about the clevis pin 82 through a specified angular movement. The ferrous plate 34 is pivotally coupled with the distal end of the actuator rod 56 at the opposite end of the linear actuator 32, such as by a ferrous plate clevis pin 84 inserted through a corresponding hole through the actuator rod 56. In this configuration, the ferrous plate 34 is able to slightly pivot on the end of the actuator rod 56 so that when the ferrous plate 34 makes contact with the electromagnet 28 it will remain in parallel intimate contact with the electromagnet 28 throughout the movement of the linear actuator 32.

In addition to the first operator interface 68 located on the front 70 of the control module 30, the exemplary control module 30 may further include a second operator interface 90 positioned on the bottom panel 92 of the control module 30. The second operator interface 90 may comprise a touchscreen display for viewing and/or modifying certain machine parameters when the heated upper platen assembly 18 is in its open position. Accordingly, the second operator interface 90 may display machine status information so that the operator can view and/or adjust certain machine parameters without having to move the heated upper platen assembly 18 down to view the first operator interface 68. A front view of second operator interface 90 can be seen in FIG. 1.

Also visible in FIG. 3B are two thermocouple connection ports 94. These thermocouple connection ports 94 are located on the power entry bracket 72 and are connection points for two external thermocouple probes. As described in the summary section above, these probes may be used for various functions. Some of the possible uses include calibration of the heated upper platen 20, closed loop temperature control of the heat press 10, external reading and/or sensing of the heated upper platen 20 and/or lower platen 16, and/or sensing of various substrate surfaces. These probes could also be used to measure the temperatures of objects outside of the heat press 10 that they are attached to. The thermocouple probes can be common K-type thermocouple probes with extended lead wires, such as may be commonly found on internet websites like Amazon.com. While the use of external thermocouple probes has been shown and described herein in the context of a clam-shell type heat press 10 in accordance with the principles of the present disclosure, it will be appreciated that external thermocouple probes could be used in a similar manner in other types of presses used for decorating substrates.

Figure 4A:
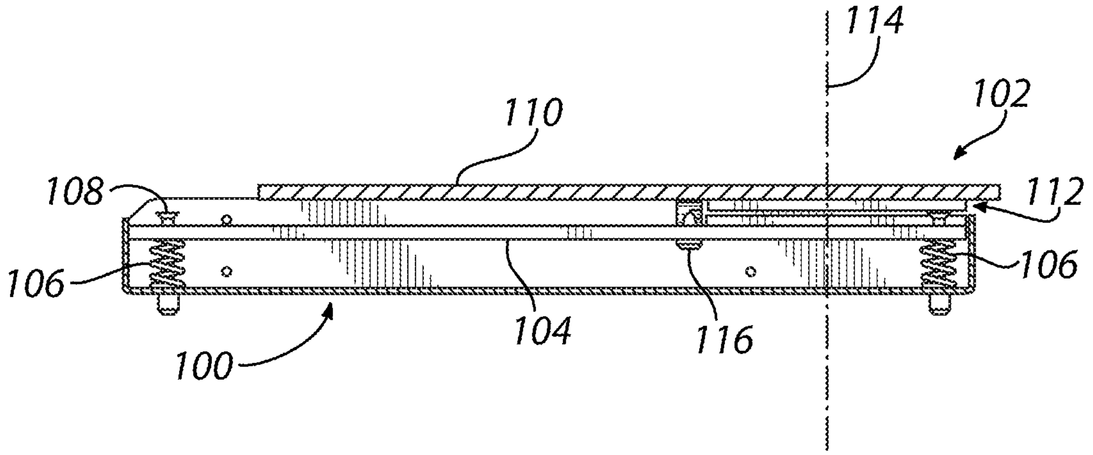
FIG. 4A is a left-side section view of a lower housing and rotary support assembly of the exemplary heat press.
Figure 4B:
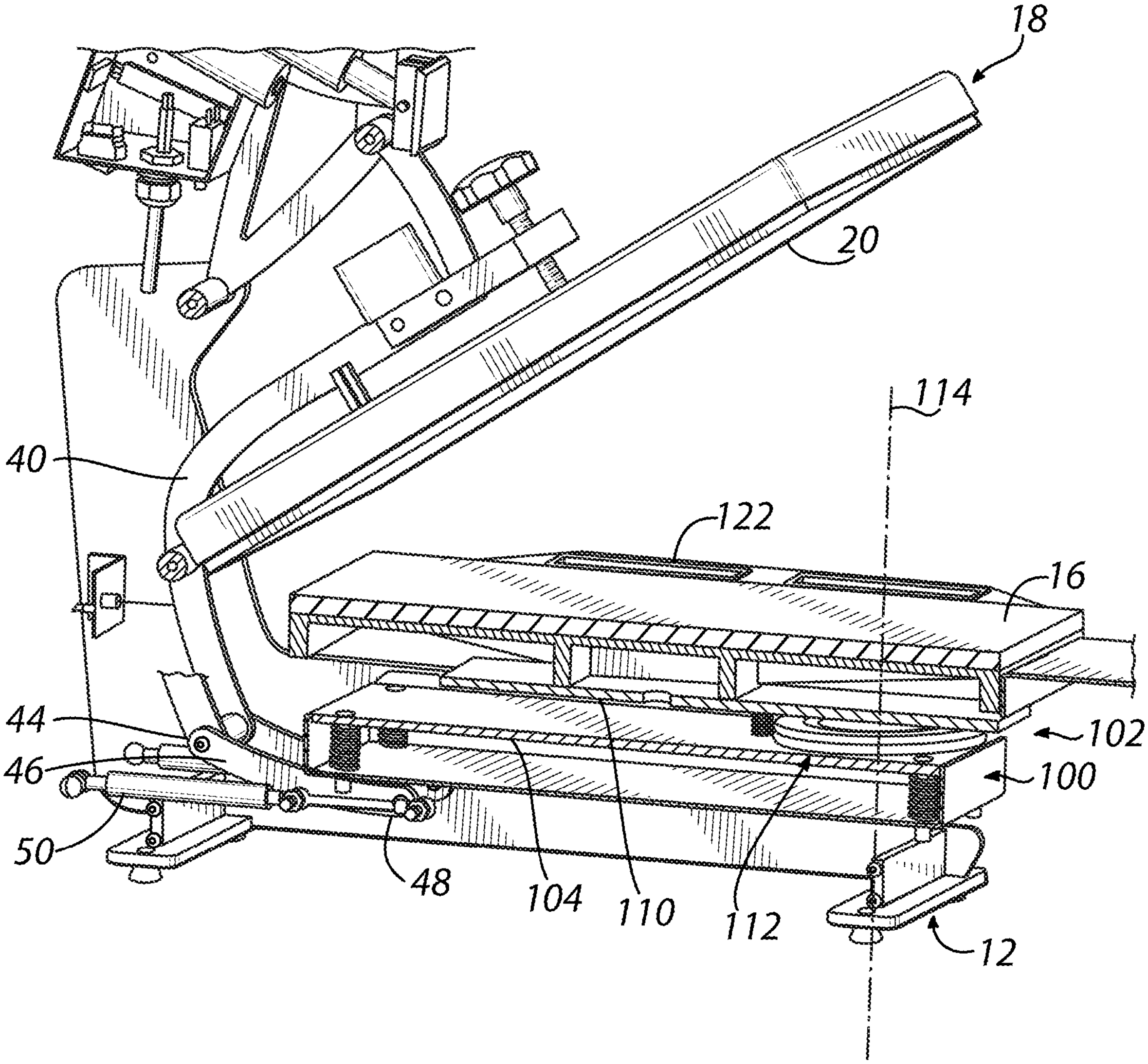
FIG. 4B is a section view depicting features of the lower platen, the lower housing, and the rotary support assembly.

FIG. 4A shows a left side view of an assembly for mounting the lower platen 16 to the support frame 12. In the embodiment shown, the assembly includes a lower housing 100 and a rotary support assembly 102 coupled with the lower housing 100. The rotary support assembly 102 comprises a bearing support plate 104 vertically movably mounted to the lower housing 100 by support springs 106 and linear guides 108 positioned at the periphery of the bearing support plate 104, such as the corners of the bearing support plate 104 for example. A platen mounting plate 110 is rotatably mounted to the bearing support plate 104 by a rotary bearing 112 such that the platen mounting plate 110 can be rotated about the vertically extending rotation axis 114 of the rotary bearing 112. A ball detent device 116 disposed between the bearing support plate 104 and the platen mounting plate 110 cooperates with detent features, such as selectively arranged recesses on the underside of the platen mounting plate 110, to define positive rotational stop positions around the rotation axis 114 of the rotary bearing 112.

FIG. 4B depicts a partial section view of the lower platen assembly 14 supported on the rotary support assembly 102. In this embodiment, the lower platen 16 is mounted on the platen mounting plate 110 such that the geometric center of the lower platen 16 is off center from the rotation axis 114 of the rotary bearing 112. Such mounting enables the lower platen 16 to rotate eccentrically with respect to the rest of the heat press 10. One rotary ring of the rotary bearing 112 is mounted to the platen mounting plate 110, and the other rotating ring of the rotary bearing 112 is mounted to the bearing support plate 104. The bearing support plate 104 has a hole in each of its four corners where the linear guides 108 protrude through and guide the bearing support plate 104 along a vertical linear path. In one embodiment, the linear guides 108 may be simple, flathead cap screws of sufficient length to allow the bearing support plate 104 to move linearly along their axes. In this way, the bearing support plate 104 may be contained in all directions except for the vertical linear movement path.

Figure 4C:
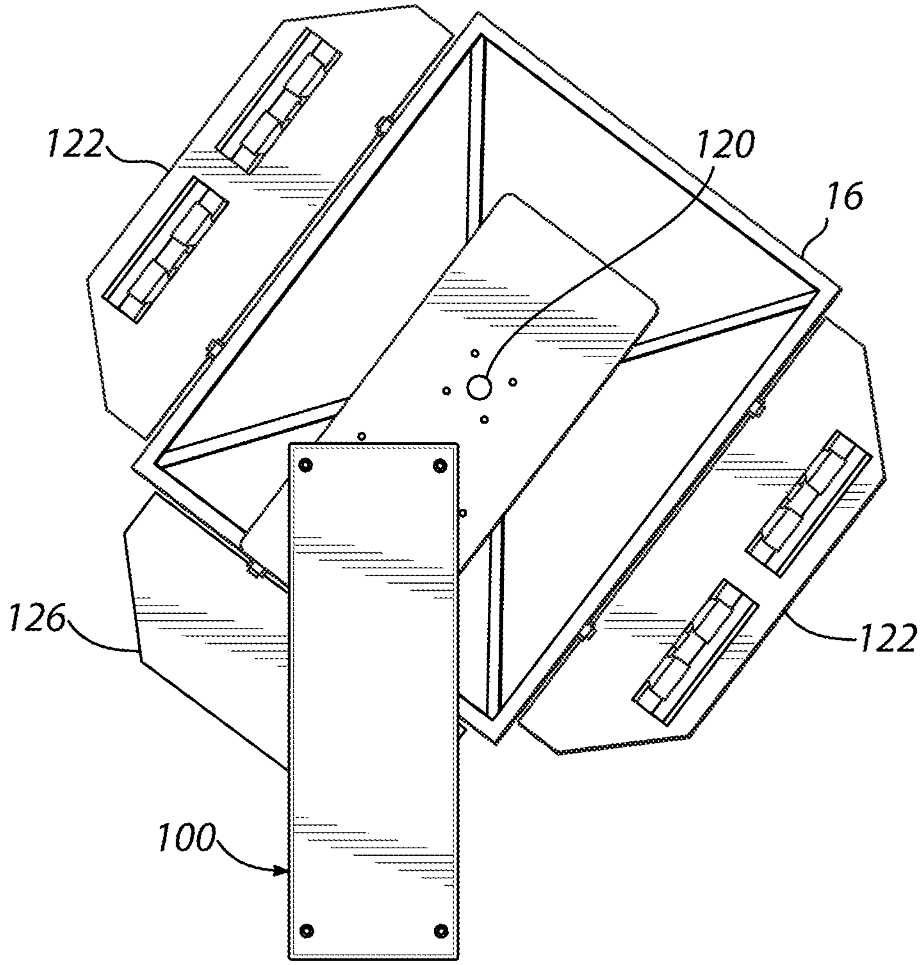
FIG. 4C is a bottom view of the lower platen assembly and rotary support assembly.

FIG. 4C depicts a bottom view of the lower housing 100 with the lower platen 16 mounted thereon and rotated away from the home position. In this view it can be seen that there is a lower platen geometric center 120 which has been rotated some distance away from the lower housing 100. This illustrates the eccentric movement of the lower platen 16 relative to the lower housing 100.

Figure 4D:
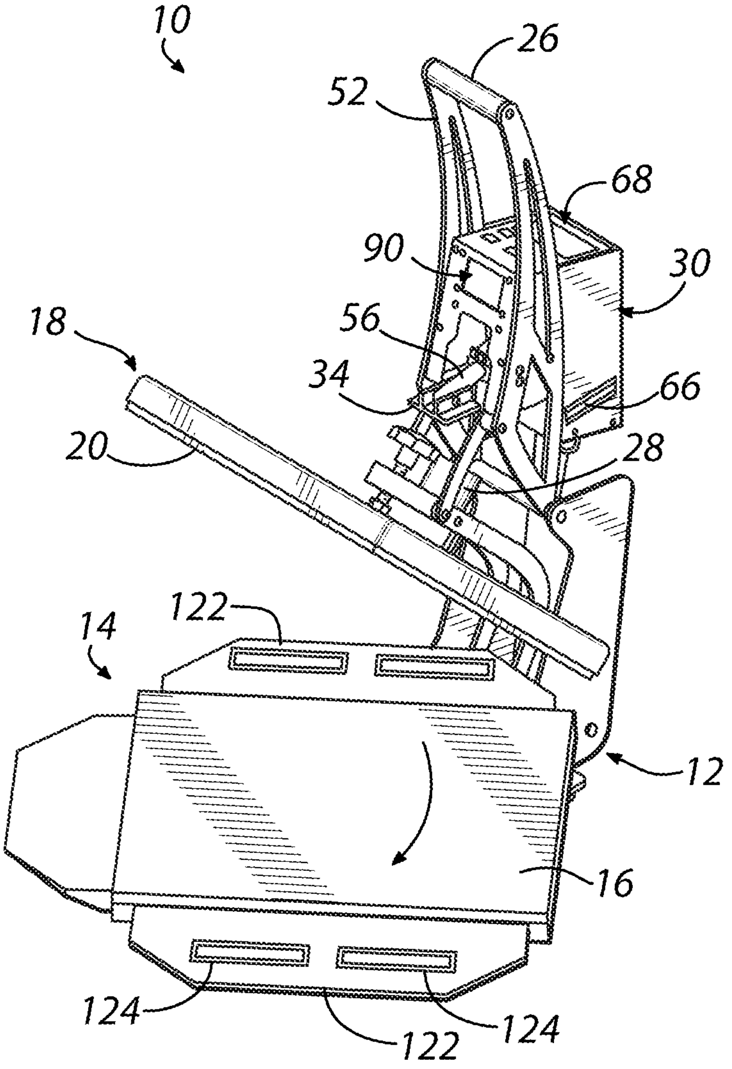
FIG. 4D is a perspective view of the exemplary heat press showing the lower platen rotated 45 degrees to the right.
Figure 4E:
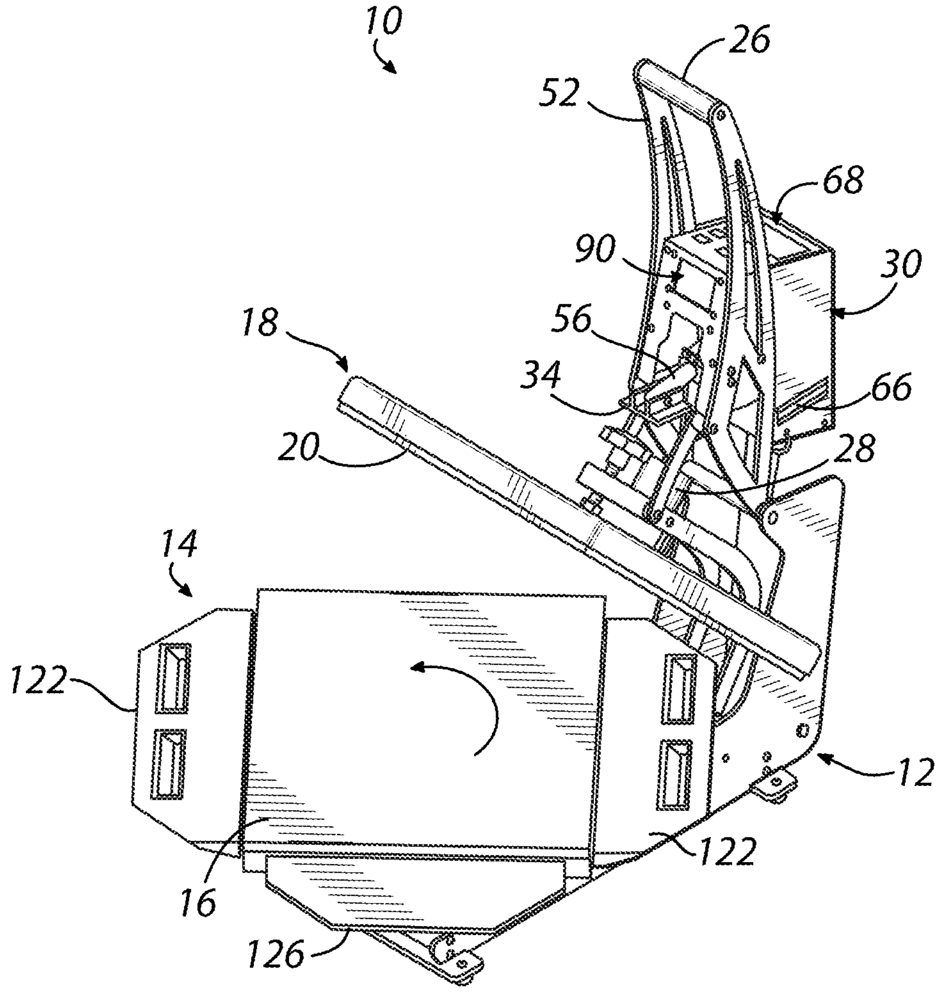
FIG. 4E is a perspective view of the exemplary heat press showing the lower platen rotated 45 degrees to the left.

FIG. 4D is a perspective view of the exemplary heat press 10 illustrating the lower platen 16 rotated a predetermined angular distance toward the right side of the heat press 10. At this point a detent may be provided to cooperate with the ball detent device 116 to hold the lower platen 16 in this position so that an operator can use the partially obstructed lower platen 16 as a work surface. For example, this position of the lower platen 16 could be used by operators who need to work on the lower platen 16 surface without the need for it to be fully exposed. In some machine operations this could be a very quick and easy way to perform functions on various substrates and decorating indicia. The operator could further continue to rotate the lower platen 16 to a different angle in order to provide the most ergonomic position for using the lower platen 16 surface as a work surface. FIG. 4E illustrates the lower platen 16 rotated a predetermined angular distance to the left side of the heat press 10. Similar to the description above, a detent may be provided to cooperate with the ball detent device 116 in the angular movement of the lower platen 16 to hold the lower platen 16 in this position so that an operator can perform operations on the substrate without the lower platen 16 shifting. As discussed above, this configuration provides a quick and easy way for operators to use the lower platen 16 as a partially obstructed work surface. The operator may also rotate the lower platen 16 to a different angle, to the right or left, in order to use the lower platen 16 as a work surface at a favorable ergonomic body position.

Figure 4F:
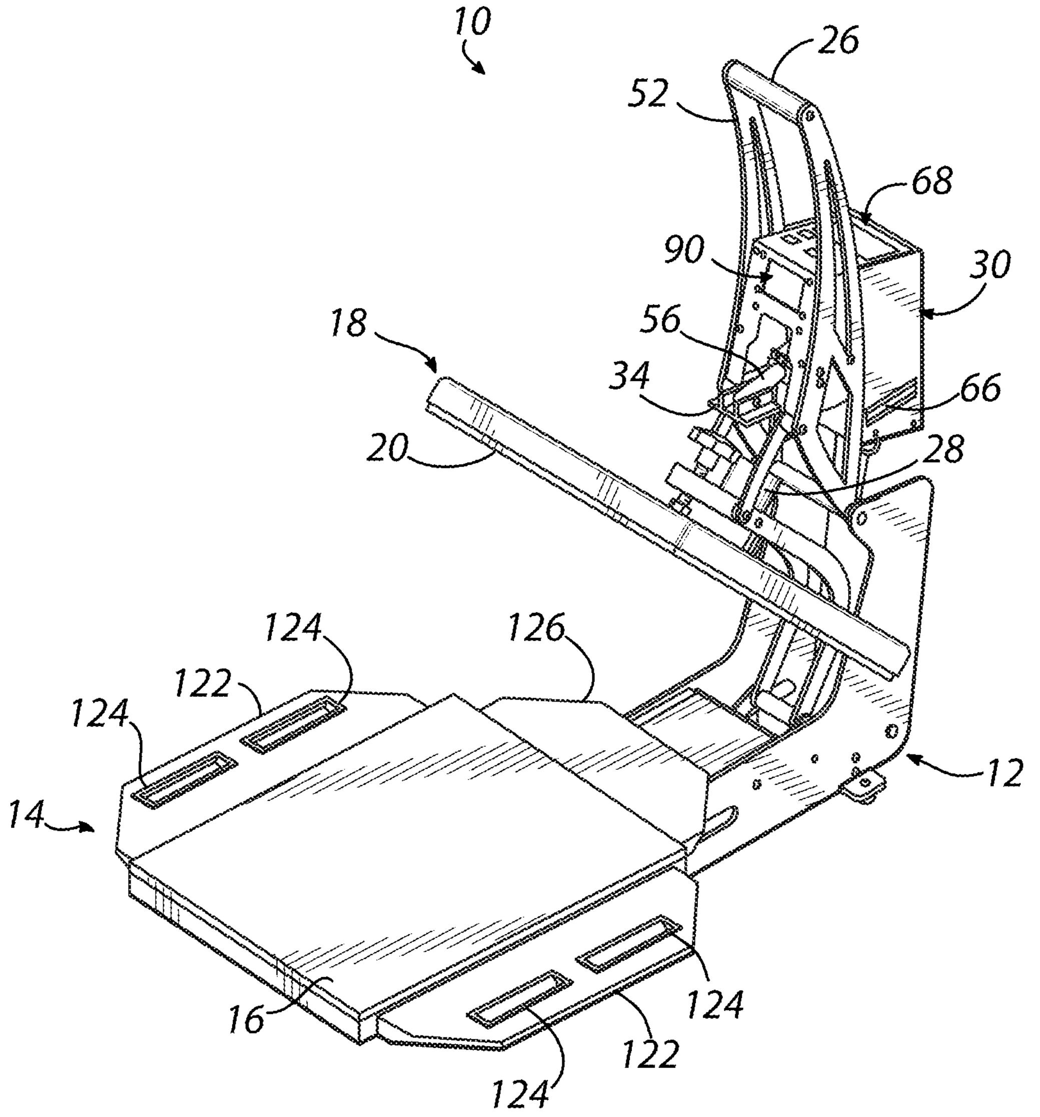
FIG. 4F is a perspective view of the exemplary heat press showing the lower platen rotated 180 degrees from the home position.

FIG. 4F illustrates a configuration where the lower platen 16 has been rotated 180 degrees from a home position associated with the normal pressing operation of the heat press 10. In this position, an operator can have a complete unobstructed clearance of the surface of the lower platen 16 for use as a work surface. A detent may be provided to cooperate with the ball detent device 116 such that the lower platen 16 is held stationary in this position for use as a work surface. In order to optimize speed of use and ergonomics of the heat press 10, the lower platen 16 may be rotated to any angular position within the 360 degrees of rotation to be used as a work surface.

In order to make it easier to rotate the lower platen 16, side trays 122 may be provided on the left and right sides of the lower platen 16. The side trays 122 may include integral tray handles 124 such that an operator can have a place to grasp and rotate the lower platen 16. These side trays 122 may be attached with standard fasteners and a heat insulating bushing between the side tray 122 and the lower platen 16. It is beneficial to insulate the attached side trays 122 from the lower platen 16 due to the fact that the lower platen 16 can become hot and difficult to touch. A front tray 126 may also be provided along a front edge of the lower platen 16. Similar to the side trays 122, the front tray 126 fastened and thermally insulated from the lower platen 16.

The side trays 122 and front tray 126 may also be arranged and configured to catch and support excess substrate material that might fall outside the boundaries of the lower platen 16. Since the lower platen 16 is able to rotate and is in close proximity to the support frame 12, any excess material that would otherwise hang down from the peripheral edges of the lower platen 16 could become caught between the rotating lower platen 16 and support frame 12. When loading a garment or substrate on to the lower platen 16 in a rotated position (such as depicted in FIGS. 4D, 4E, and 4F) an operator can ensure that the entire substrate may supported by the lower platen 16, the side trays 122, and the front tray 126 so that the lower platen 16 can be freely rotated back to its home position.

Figure 5A:
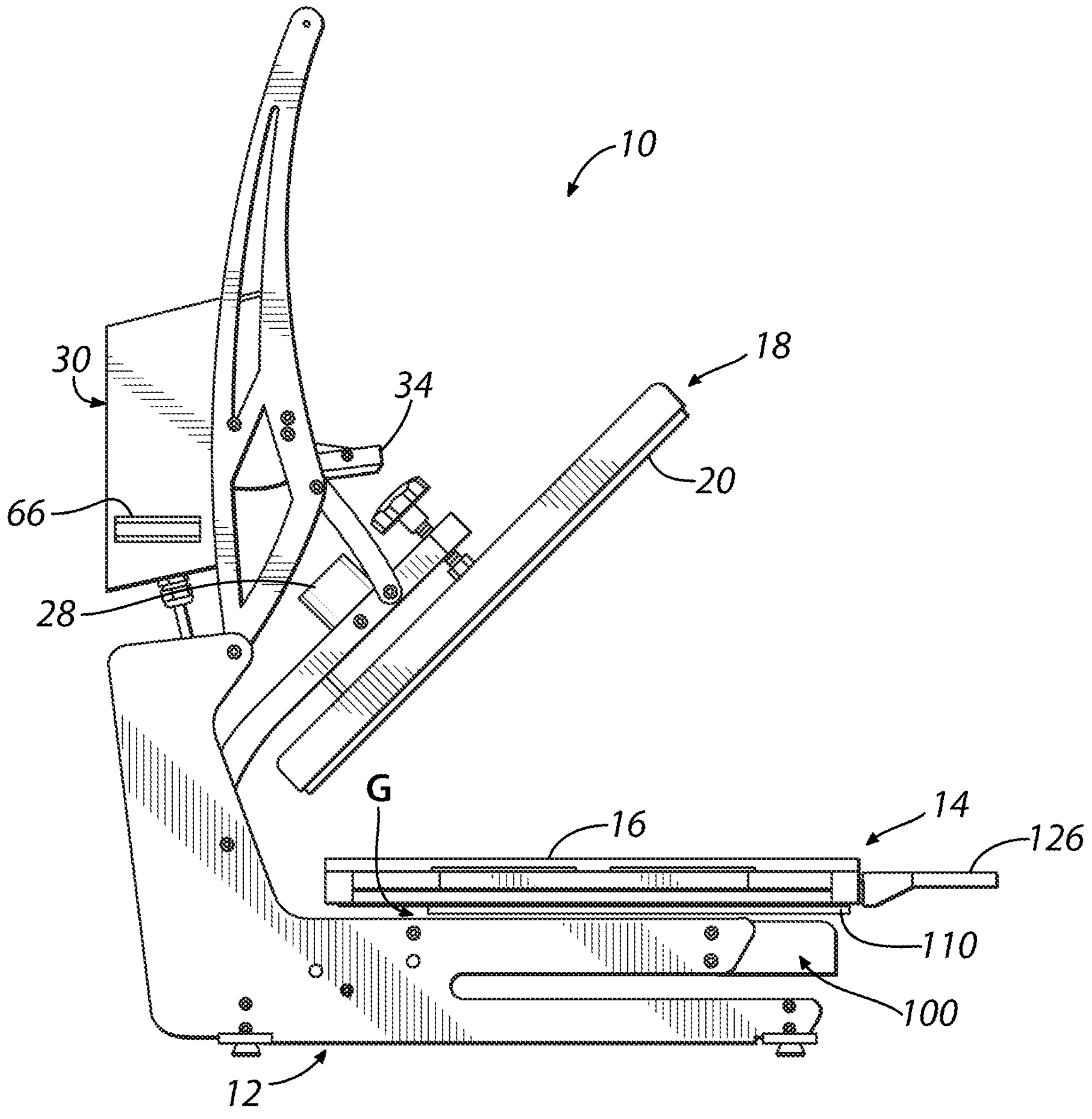
FIG. 5A is a left side view of the exemplary heat press in the open position and the lower platen in its upward position.
Figure 5B:
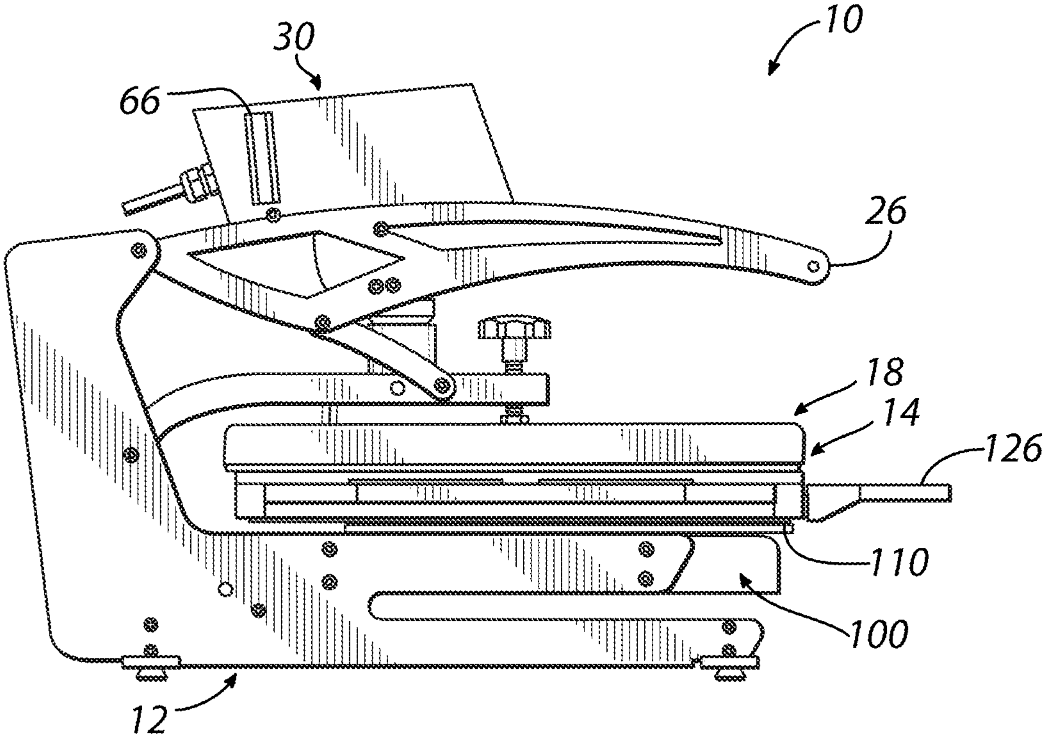
FIG. 5B is a left side view similar to FIG. 5A, illustrating the exemplary heat press in the closed position with the lower platen in its lower position contacting the lower housing.

FIG. 5A is a left side view of the exemplary heat press 10 in a fully open position. In this view, a rotating platen clearance gap G can be seen between the lower surface of the platen mounting plate 110 and an upper horizontal surface of the lower support frame 12. This rotating platen clearance gap G is beneficial to allow the lower platen 16 to rotate freely around its angular movement without hitting or rubbing against any other part of the heat press 10. It is the function of the support springs 106, as depicted in FIG. 4B, to support the lower platen 16 at a height that results in this rotating platen clearance gap G. FIG. 5B is a left side view of the heat press 10 in the closed and clamped condition. It can be seen that in this position, the upper platen 20 has contacted the lower platen 16 and has forced the platen mounting plate 110 down into contact with the support frame 12, thereby eliminating the rotating platen clearance gap G. In this configuration, any additional forces applied by the upper platen 20 to the lower platen 16 will be transmitted to the support frame 12. This ensures that no forces will be borne by parts of the rotary support assembly 102 once contact has been made. Rather, all forces created in the system will be carried by the support frame 12.

Figure 6A:
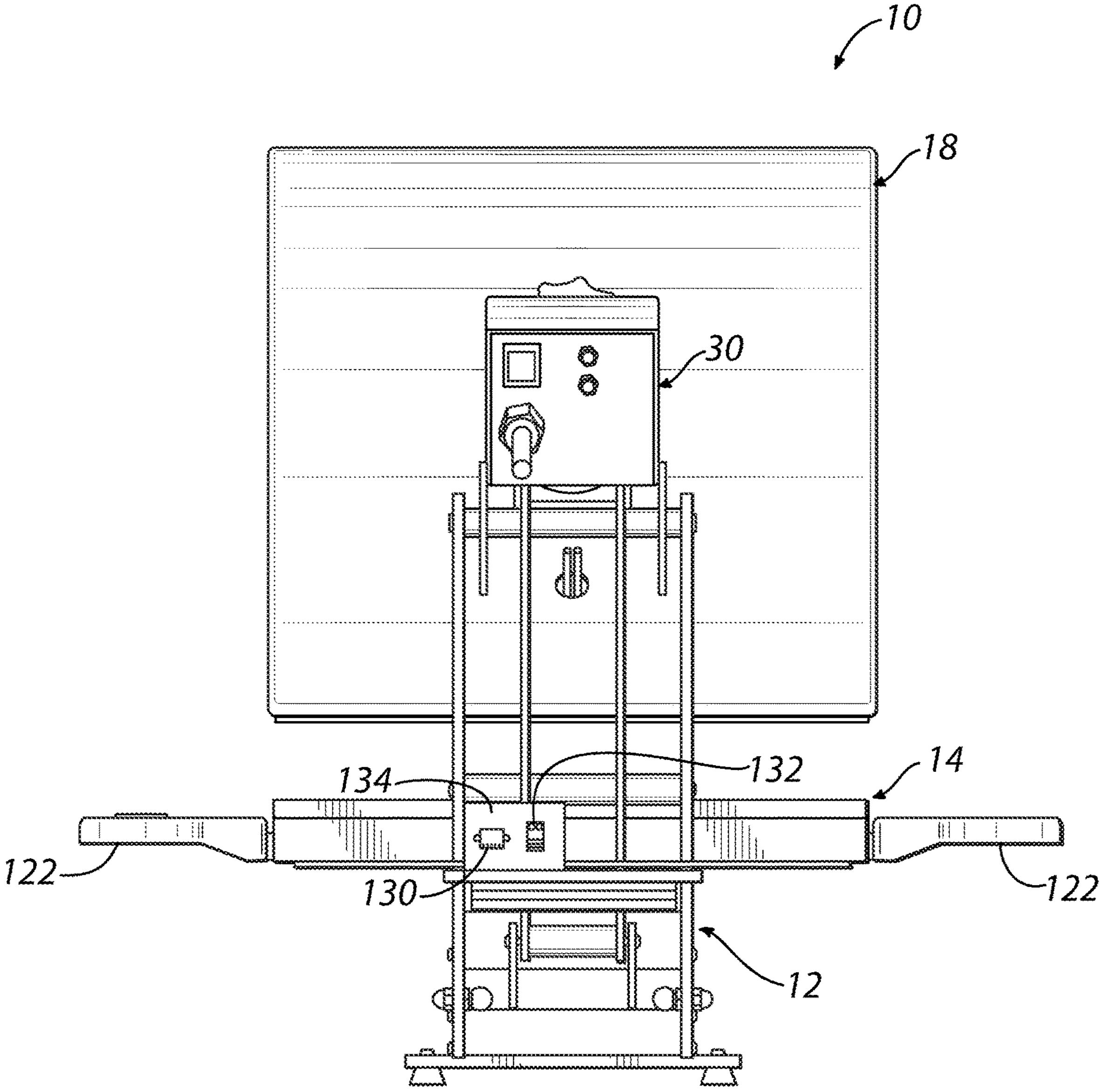
FIG. 6A is a partial rear elevation view of the exemplary heat press illustrating lower platen temperature and presence sensors.
Figure 6B:
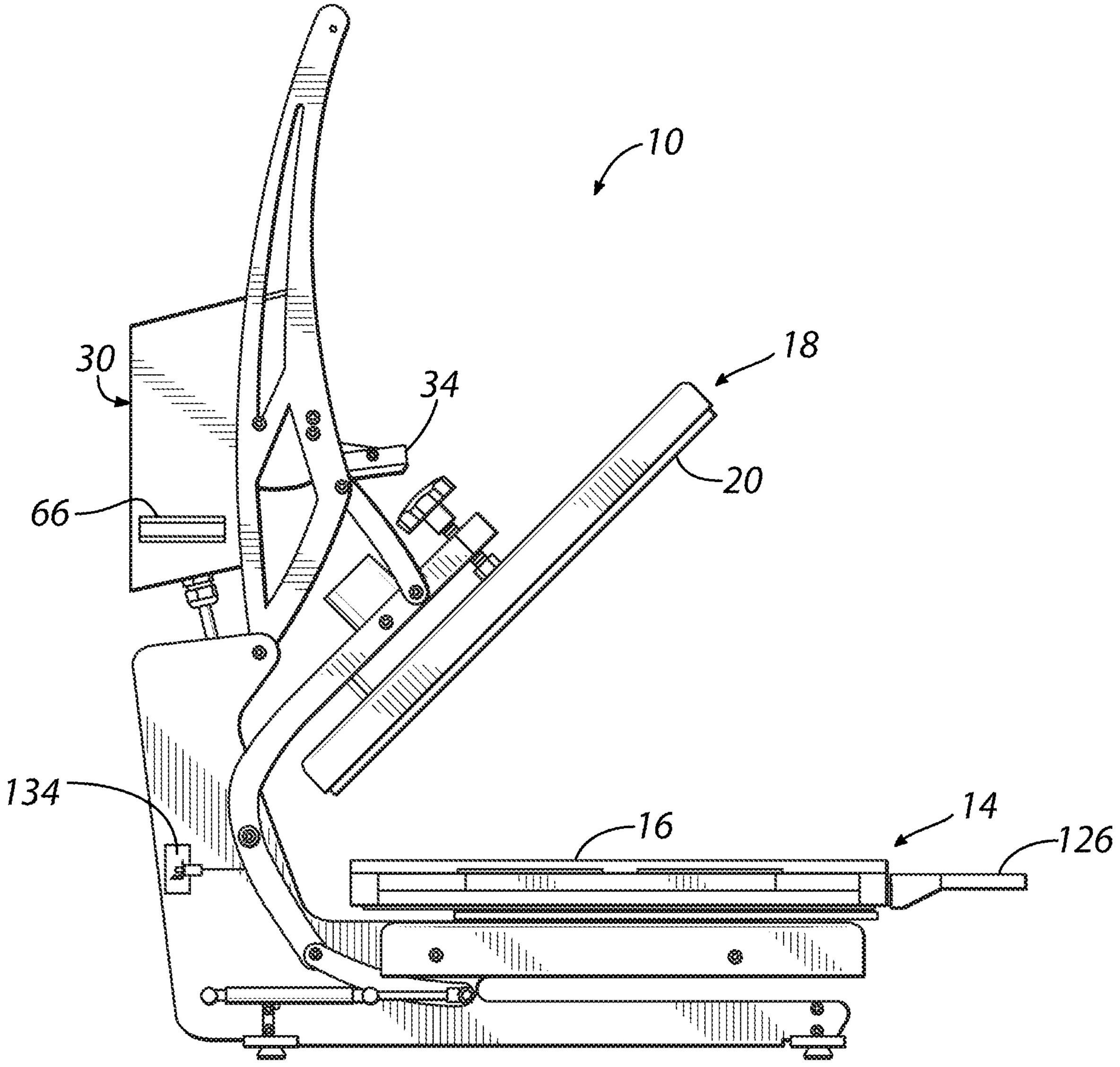
FIG. 6B is a partial side view of the exemplary heat press illustrating lower platen temperature and presence sensors.

FIG. 6A is a rear view of the exemplary heat press 10 in the open condition. In this view, two sensors 130, 132 are shown mounted on a lower platen sensor bracket 134. The horizontal centerline of each of these sensors 130, 132 is in the same a horizontal plane as the horizontal centerline of the lower platen 16. The first sensor 130 may be a non-contact temperature sensor configured to accurately measure a temperature of the lower platen 16 from some distance. The control module 30 can use information related to the sensed temperature to regulate the amount of heat transmitted to the lower platen 16 at times when the heat press 10 is not being used to press substrates. For embodiments of a heat press 10 that includes a motorized system for automatically raising and lowering the upper platen assembly 18, the control module 30 can modulate the amount of heat transmitted to the lower platen 16 for tight temperature control of the lower platen 16. Additionally, in a semi-automatic embodiment, the control module 30 can be configured to warn an operator to lower the upper heated platen assembly 18 at times when the heat press 10 is not being used to press substrates. The second sensor 132 may be a non-contact presence sensor configured to detect when the lower platen 16 is in the proper location for the upper platen assembly 18 to be lowered (e.g., the home position of the lower platen 16). Feedback from this non-contact present sensor 132 can also be used by the control module 30 to determine when the operator has changed out the lower platen 16 for a differently sized lower platen. Thus, the heat press 10 may automatically determine what type and size of platen has been placed into the heat press. FIG. 6B is a left side view showing the location of the lower platen sensor bracket 134 some distance behind but in-line with the rear edge of the lower platen 16.

Figure 7:
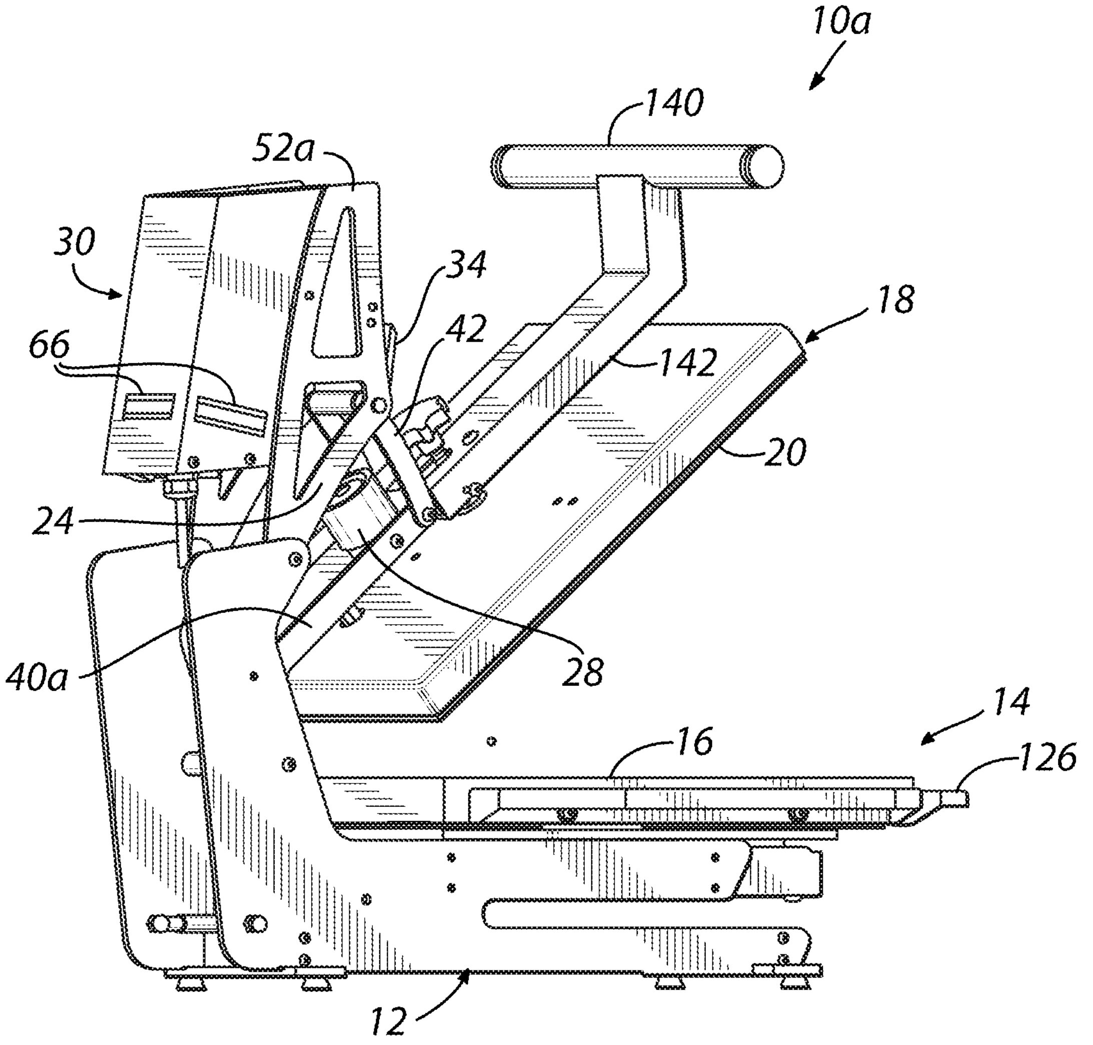
FIG. 7 is a rear perspective view of another exemplary heat press in accordance with the present disclosure, illustrating alternative operator handle assembly and shortened main lever arms.

FIG. 7 is a rear side view of another embodiment of a heat press 10*a*, similar to the heat press 10 described above with respect to FIGS. 1-6B, wherein the lever arms 52*a* have been shortened so they are flush with the front edge of the control module 30. Most conventional clam-shell type heat press designs are configured similar to the heat press 10 depicted in FIG. 1, wherein an operator handle 26 is disposed between extended lever arms 52 with which the operator can operate the press. However, when the press is in the open position in such configurations, the operator handle 26 is quite high in the air as shown in FIG. 1. An operator must therefore reach up and over the entire machine to pull down on the operator handle 26 shown in FIG. 1. In the alternative embodiment depicted in FIG. 7, an alternative operator handle 140 is coupled to an extension of the first intermediate link 40*a*. This position greatly reduces the distance an operator must reach to operate the heat press 10*a*, which leads to a more ergonomic design. Additionally, when the operator handle 26 is located between the lever arms 52 as in FIG. 1, only one hand can be used to pull downwardly on the handle 26. The alternative handle 140 allows for a much wider handle so that an operator can use two hands to pull downwardly on the handle 140. This leads to better ergonomics and less strain on the shoulder joints of the operator.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A heat press for decorating substrates, comprising:
a support frame;
a lower platen assembly supported on the support frame and including a lower platen;
a linkage assembly comprising at least an upper link arm pivotally coupled with the support frame for movement to and between first and second positions;
an upper platen assembly operatively coupled with the support frame by the linkage assembly for movement relative to the lower platen assembly to and between a first, open condition away from the lower platen assembly and a second, closed condition adjacent the lower platen assembly, as the upper link arm is moved to and between the first and second positions; and
a linear actuator operatively coupled for movement with the upper link arm, the linear actuator having an actuator rod movable to and between at least a first, retracted position in a direction away from the lower platen assembly, and a second, extended position in a direction toward the lower platen assembly;
the linear actuator cooperating with the linkage assembly such that:
the linear actuator moves the upper platen assembly in the second, closed condition in a direction to clamp an upper platen against the lower platen by moving from the second extended position toward the first retracted position.

2. The heat press of claim 1, further comprising a handle cooperating with the linkage assembly and operable to move the upper link arm between the first and second positions.

3. The heat press of claim 1, wherein the linear actuator moves from the retracted position toward the extended position to raise the upper platen away from the clamped condition relative to the lower platen.

4. The heat press of claim 1, wherein the linkage assembly is biased in a direction such that the upper platen assembly is moved toward the first, open condition.

5. The heat press of claim 1, further comprising:
an electromagnet supported on the linkage assembly; and
a magnetically attractive member on the linear actuator;
the electromagnet positioned and arranged to selectively magnetically couple with the magnetically attractive member as the upper link arm is moved from the first position toward the second position;
whereby movement of the linear actuator toward the retracted position pulls the upper platen into clamping engagement with the lower platen.

6. The heat press of claim 1, further comprising a controller communicating with and configured to control operation of the linear actuator.

7. The heat press of claim 6, wherein:
the controller is supported on the upper link arm;
the heat press has a front end along a side of the lower platen assembly opposite the linkage assembly;
the controller comprises a first user interface positioned for viewing by a user located at the front end of the heat press when the upper link arm is in the first position;

the controller comprises a second user interface positioned for viewing by a user located at the front end of the heat press when the upper link arm is in the second position.

8. The heat press of claim 6, further comprising:

at least one sensor in communication with the controller;

the at least one sensor configured to detect an operating condition associated with the heat press and comprising at least one of:

an accelerometer, or a thermocouple;

wherein the controller is configured to control operation of the heat press based on information related to an operating condition detected by the at least one sensor.

9. The heat press of claim 8, wherein the controller is configured to control operation of at least one of the linear actuator or an electromagnet positioned and arranged to selectively magnetically couple with the linear actuator as the upper link arm is moved from the first position toward the second position based on information related to an operating condition detected by the at least one sensor.

10. The heat press of claim 6, further comprising at least one visual indicator communicating with the controller and configured to illuminate under the command of the controller based on an operating status of the heat press.

11. The heat press of claim 1, wherein the linkage assembly further comprises:

a first intermediate link pivotally coupled with the support frame;

a second intermediate link coupled between the upper link arm and the first intermediate link; and a lower link coupled with the first intermediate link and a biasing member;

the biasing member biasing the linkage assembly such that the upper link arm is moved toward the first position and the upper platen assembly is moved toward the first, open condition.

12. The heat press of claim 1, wherein the lower platen is supported on the support frame for movement relative to the support frame in a plane parallel to the plane of the lower platen, such that the lower platen can be moved into and out of registration with the upper platen assembly.

13. The heat press of claim 12, wherein the lower platen assembly further comprises:

a lower housing supported on the support frame; and a rotary support assembly on the lower housing and coupled with the lower platen to facilitate rotational movement of the lower platen in a plane parallel to the plane of the lower platen.

14. The heat press of claim 13, wherein:

the rotary support assembly is coupled with the lower housing for translational movement along a vertical axis relative to the plane of the lower platen;

the rotary support assembly biased in a direction away from the lower housing and moved by engagement of the upper platen assembly with the lower platen assembly such that the lower platen contacts the lower housing, whereby the rotational movement of the lower platen is inhibited and force applied to the lower platen from the upper platen is transmitted to the support frame.

15. The heat press of claim 13, wherein the rotary support assembly comprises a rotary bearing having a rotational axis that is offset from a geometric center of the lower platen such that the rotational movement of the lower platen comprises an eccentric movement defined by rotation of the geometric center of the lower platen about the rotational axis of the rotary bearing.

* * * * *